P. EVENS, Jr.

Thread Tension Wheels for Sewing-Machines.

No. 5,859. Reissued May 5, 1874.

*Witnesses*

Chas. C. Wilson

Edmund Masson

*Inventor.*

Platt Evens Jr.

By A. B. Stoughton atty.

AM. PHOTO-LITHOGRAPHIC Co. N. Y. (OSBORNE'S PROCESS.)

UNITED STATES PATENT OFFICE.

PLATT EVENS, JR., OF CINCINNATI, OHIO, ASSIGNOR TO THE FLORENCE SEWING-MACHINE COMPANY.

IMPROVEMENT IN THREAD-TENSION WHEELS FOR SEWING-MACHINES.

Specification forming part of Letters Patent No. 53,527, dated March 27, 1866; reissue No. 5,859, dated May 5, 1874; application filed July 30, 1873.

*To all whom it may concern:*

Be it known that PLATT EVENS, JR., of Cincinnati, in the county of Hamilton and State of Ohio, did invent certain new and useful Improvements in Thread-Tension Wheels or Surfaces for Sewing-Machines; and that the following is a full, clear, and exact description of the same, reference being had to the accompanying drawings, making a part of this specification, in which—

Figure 1:
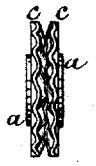
Figure 2:
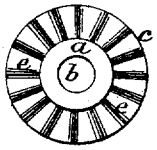
Figure 3:
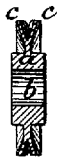

Figure 1 represents an edge view of the wheel in question. Fig. 2 represents a side view thereof, and Fig. 3 represents a transverse section taken centrally through the tension-wheel.

To properly regulate the tension upon thread used in sewing-machines has occupied much thought and study, and many patents have been granted therefor.

There is a feature connected with the tension of the thread that causes much difficulty, viz., preventing the slip or loosening up of the thread upon the tension-wheel when the thread is cut off at the end of the seam, which allows it to slack on the wheel; and until all this slack is taken up again, when the machine or the sewing is again started, there will, of course, be irregular stitches made.

Appliances have been made to the tension-wheel to prevent the slipping or slacking up of the thread when cut; but in some cases these appliances soon wear out, and in others involve additions to the surface of the wheel where the thread winds around that may be exceptionable in point of expense or durability.

To avoid this slipping of the thread by the metallic surfaces of the wheel alone are the object and purpose of this invention; as well as to secure the thread from injurious friction or a change of twist.

And the invention consists in the use of corrugated surfaces adjacent to each other, the projections upon one of the corrugated surfaces being opposite the depressions of the opposite corrugated surface, so that the thread or turns of the thread around the wheel shall have a zig-zag instead of a regular circular coil, and have many angular deflections, which hold it to the surfaces, and thus prevent the slipping or slacking up when the thread is parted.

To enable others skilled in the art to make and use this invention the following description of it is given, in connection with the drawings.

*a* represents a hub of metal, having a suitable hole, *b*, through it for receiving the shaft or journal upon or with which the wheel is to turn as the thread is drawn to the sewing point. Upon the perimeter of this hub are secured the two flaring corrugated disks or flanges *c*, which should be in close contact where they are joined to the hub, and flaring toward their perimeters, for the easy reception of the thread, which has one, two, or more full turns around the wheel so made. The corrugations *e* run radially from the center of the wheel, and the projections on one of the flanges are placed opposite the depressions of the other flange, so that a thread laid in between them, and encircling the wheel, shall have in it a series of angular deflections and many points of impact with the opposing smooth corrugated surfaces, which prevent it from slipping when the thread is cut or parted, and secure it from injury by friction or change of twist when drawn to the sewing point.

The corrugations are put into the flanges, which are made of smooth thin sheet metal, by means of dies; or, in other words, the flanges are stamped up, and thus cheaply made, and may be soldered or otherwise united to the hub *a*.

The grooves in pulley or belt wheels have been roughened, so as to give more bite upon the belt which partially encircles the pulley. But this involves a different construction, effect, and application, as the belt for a driving power is not presumed to be parted, and certainly is not cut as the thread of a sewing-machine is at the end of every seam. Nor would the slacking of a driving-belt, if it occurred, result in any such irregularity as is incident to the slacking of a thread in a sewing-machine. Nor are the depressions of one corrugated flange, set opposite the projections of its mate or fellow, as herein proposed, to attain the many deflections given to the thread laid or wound between the smooth corrugated surfaces.

Having thus fully described this invention, what is claimed herein as the invention of said PLATT EVENS, Jr., is

The tension-wheel having a thread-groove, constructed and operating substantially as herein described, for making and regulating tension in sewing-machines.

FLORENCE SEWING-MACHINE CO.,
By WM. B. HALE, *President.*

Witnesses:
SIDNEY STRONG,
CHAS. H. CLARKE.